June 15, 1965 R. A. WESTPHAL 3,189,364
AUTOMATIC FOLDUP SEAT FOR GOLF CART
Filed Dec. 30, 1963
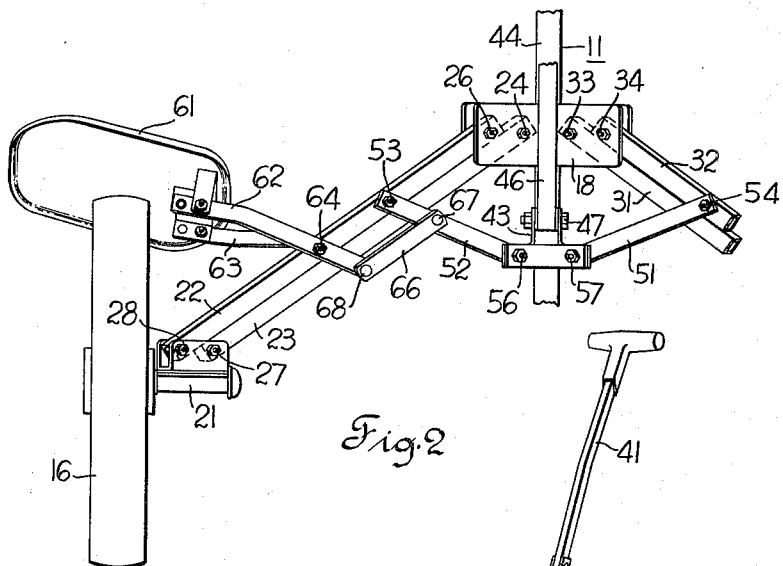
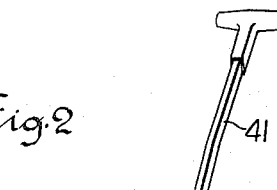
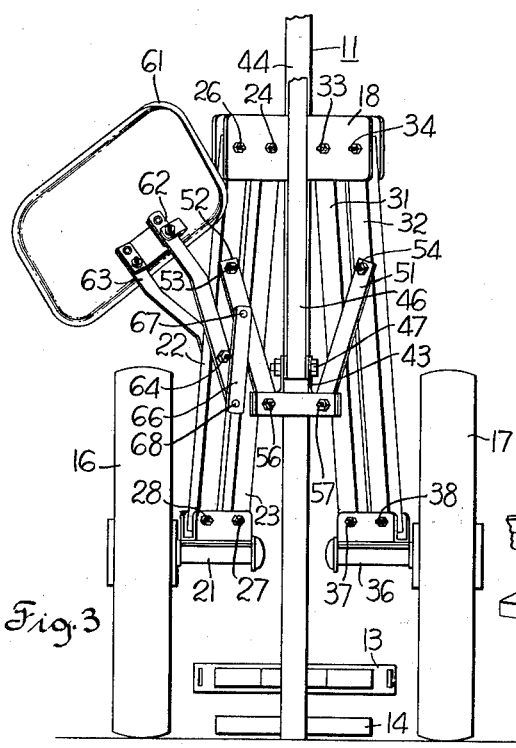
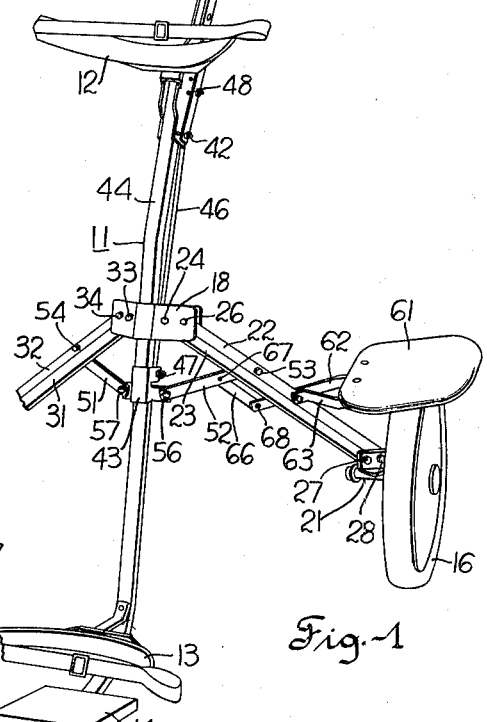
Inventor
Robert A. Westphal
By Charles T. Schmidt
Attorney

3,189,364
AUTOMATIC FOLDUP SEAT FOR GOLF CART
Robert A. Westphal, Frankfort, Mich., assignor to Allis-Chalmers Sports Products, Inc., a corporation of Illinois
Filed Dec. 30, 1963, Ser. No. 334,289
8 Claims. (Cl. 280—36)

This invention relates to a seat for a golf cart which folds up automatically upon folding up the golf cart.

It is the object of this invention to provide a seat for a foldup golf cart which is attached thereto as a component part thereof and which extends to an operative position permitting the golfer to sit upon the seat when the cart is extended to its normal operating condition.

It is the further object of this invention to provide a golf cart seat with supporting linkage causing it to automatically move from an extended position in which a golfer may sit thereon to a retracted or foldup position when the wheel linkage of the golf cart is moved from its extended position to its retracted position.

It is a further object of this invention to provide an automatic foldup seat for a golf cart which is connected to the wheel supporting linkage and which is disposed above one of the wheels of the golf cart in its operative extended position.

It is a further object of this invention to provide a golf cart seat with linkage effecting automatic foldup of the seat when the golf cart is folded up and wherein the seat is disposed above one of the wheels of the golf cart and is resiliently deflectable upon the golfer sitting on the seat to come into contact with the wheel thereby permitting the wheel to support a part of the weight of the occupant of the seat and preventing rolling action of the wheel.

These and other objects and advantages of this invention will be apparent to those familiar with the art to which this invention pertains upon reading the following description in conjunction with the drawings in which:

FIG. 1 is a perspective view of a golf cart in which the present invention is incorporated;

FIG. 2 is a rear view of the golf cart shown in FIG. 1 with the wheels in an extended position; and FIG. 3 is a rear view of the golf cart in a foldup position.

Referring to the drawing, the golf cart has an elongated central frame structure 11 which has golf bag brackets 12, 13 connected adjacent opposite ends thereof and a bag mounting pad 14 at its extreme lower end. Each of the laterally spaced wheels 16, 17 are attached to the bracket 18 by a pair of parallel legs. The bracket 18 is rigidly secured to the square section tube 44 of the frame structure 11 and a pair of parallel legs 22, 23 are connected to the bracket 18 by a pair of pivot means in the form of bolts 24, 26. The lower ends of the legs 22, 23 are pivotally connected to an axle bracket 21 by pivot means including bolts 27, 28. The axes of the bolts 24, 26, 27, 28 are parallel to one another. Likewise the legs 31, 32 are pivotally connected at their upper ends to bracket 18 by a pair of pivot means including bolts 33, 34 and are connected at their lower ends to the axle bracket 36 by a pair of pivot members including bolts 37, 38. The axes of bolts 33, 34, 37, 38 are parallel to one another.

The handle 41 of the golf cart is pivotally connected to the central frame structure 11 by a bolt 42 and is held in its extended position as illustrated by a latching mechanism, not shown. A manually operated mechanism is provided for folding up the cart and for holding the wheels in their extended position. This manually operated mechanism includes a reciprocably mounted sliding bracket 43 which surrounds the square section tube 44. As illustrated in the drawings, a handle operated link 46 is pivotally connected at its lower end to rearwardly extending ears of bracket 43 by a bolt and nut connection 47. The upper end of link 46 is pivotally connected to the handle 41 by a nut and bolt connection 48. A pair of braces 51, 52 are pivotally connected at their outer ends to legs 22, 32 by nut and bolt connections 53, 54 and are pivotally connected at their inner ends to the sliding bracket 43 by the nut and bolt connections 56, 57. When the handle is pivoted downwardly about its pivot connection 42, the link 46 will force the sliding bracket 43 downwardly along the central frame structure 11 thereby moving the wheels and their supporting legs from the extended position illustrated in FIG. 2 to the collapsed or foldup position shown in FIG. 3.

A golfers' seat 61 is connected to the outer ends of a pair of links 62, 63 which are pivoted to the outer leg 22 by nut and bolt connection 64. A link 66 has one end pivotally connected to brace 52 by pivot member 67 intermediate the opposite ends of brace 52 and its other end connected to the inner end of link 62 by a pivot member 68. Thus, the leg 22, brace 52 and links 62, 66 form a quadrilateral parallel linkage for moving the seat automatically between occupant receiving and foldup positions upon folding up the cart.

The seat 61 is constructed of a sufficiently resilient material that it may be deflected downwardly, under the weight of an occupant, to rest on the tire of wheel 16. Thus, the weight of the occupant of the seat is transferred directly from the seat to the tire and additionally the engagement of the seat with the tire prevents the wheel from rolling. When the seat is not occupied it does not engage the tire.

From the foregoing description, it is apparent that I have provided an inexpensive, convenient and totally satisfactory seat for a golf cart which automatically folds between an occupant receiving position and a foldup position simultaneously with the extension and folding up of the golf cart. Although I have illustrated a seat which is sufficiently resilient to permit it to deflect to come into contact with the tire upon a person sitting on the seat, a suitable flexible connection could be provided between the links 62, 63 and the seat 61 to achieve the same function.

The embodiments of the invention in which an exclusive property or privilege is claimed are defined as follows:

1. In a golf cart the combination comprising:
   a central frame structure,
   a pair of wheels disposed at opposite lateral sides of said frame structure,
   a pair of wheel supporting legs having their corresponding upper ends pivotally connected to said central frame structure,
   means connecting the corresponding lower ends of said legs to said wheels, respectively,
   a bracing structure for said legs including
      a bracket mounted on and slidable along said central frame member and
      a pair of braces pivotally connected at their inner ends to said bracket and pivotally connected at laterally outward points to said legs, respectively,
   a seat and
   a seat supporting linkage for said seat including
      a first link having one of its opposite ends supportingly connected to said seat,
      a pivot connection between said first link and one of said legs,
      a second link pivotally connected at one end to the brace connected to said one leg in spaced relation to the pivot connection between said brace and said one leg and
      means pivotally connecting the other end of said second link to said first link in spaced relation to the pivot connection between the latter and said one leg, said legs and seat swinging from an extended operating position toward said central frame structure to a foldup position when said bracket is slid along said central frame structure.

2. The structure set forth in claim 1 wherein said seat is disposed above said wheel connected to said one leg when in said operating position.

3. The structure set forth in claim 2 wherein said seat resiliently deflects downwardly into contact with said wheel upon being subjected to a predetermined downwardly acting load.

4. In a golf cart the combination comprising:
an elongated central frame structure,
a first bracket rigidly secured to said frame structure,
a second bracket connected to said frame structure for reciprocal sliding movement therealong,
a pair of wheels disposed at opposite lateral sides of said frame structure,
a pair of wheel supporting legs having their corresponding upper ends pivotally connected to one of said brackets,
means connecting the corresponding lower ends of said legs to said wheels, respectively,
a pair of braces pivotally connected at their inner ends to the other of said brackets and pivotally connected at their outer ends to said legs, respectively,
a seat and
a seat supporting linkage for said seat including
 a first link having one of its opposite ends supportingly connected to said seat,
 a pivot connection between said first link and one of said legs,
 a second link pivotally connected at one end to the brace connected to said one leg intermediate the ends thereof,
 means pivotally connecting the other end of said second link to the other of the opposite ends of said first link,
said legs and seat swinging from an extended operating position to a foldup position when said second bracket is slid along said central frame structure.

5. The structure set forth in claim 4 wherein said one bracket is said first bracket.

6. The structure set forth in claim 5 wherein said seat is disposed above said wheel connected to said one leg when in said operating position.

7. The structure set forth in claim 6 wherein said seat resiliently deflects downwardly into contact with said wheel upon being subjected to a predetermined downwardly acting load.

8. In a golf cart the combination comprising:
a central frame structure,
a pair of wheels disposed at opposite lateral sides of said frame structure,
means supporting one of said wheels including a leg having its upper end pivotally connected to said central frame structure and its lower end connected to said one wheel,
means for pivoting said leg about its connection with said frame structure between extended and foldup positions,
a seat and
a seat supporting linkage including
 a first link supporting said seat on one of its ends and pivotally connected intermediate its ends to said leg, and
 a second link spaced from said leg and pivotally connected at spaced points thereof to the other end of said first link and to said means for pivoting said leg, respectively,
said seat swinging from an occupant receiving position above said one wheel to a foldup position when said leg is moved from its extended position to its foldup position.

References Cited by the Examiner
UNITED STATES PATENTS 2,673,589   3/54   Kunkel.
2,777,707   1/57   Cloes.

ARTHUR L. LA POINT, *Primary Examiner.*